No. 868,578. PATENTED OCT. 15, 1907.
W. T. NICHOLLS.
METHOD AND APPARATUS FOR MAKING GLASS SHEETS.
APPLICATION FILED OCT. 13, 1906.
3 SHEETS—SHEET 1.
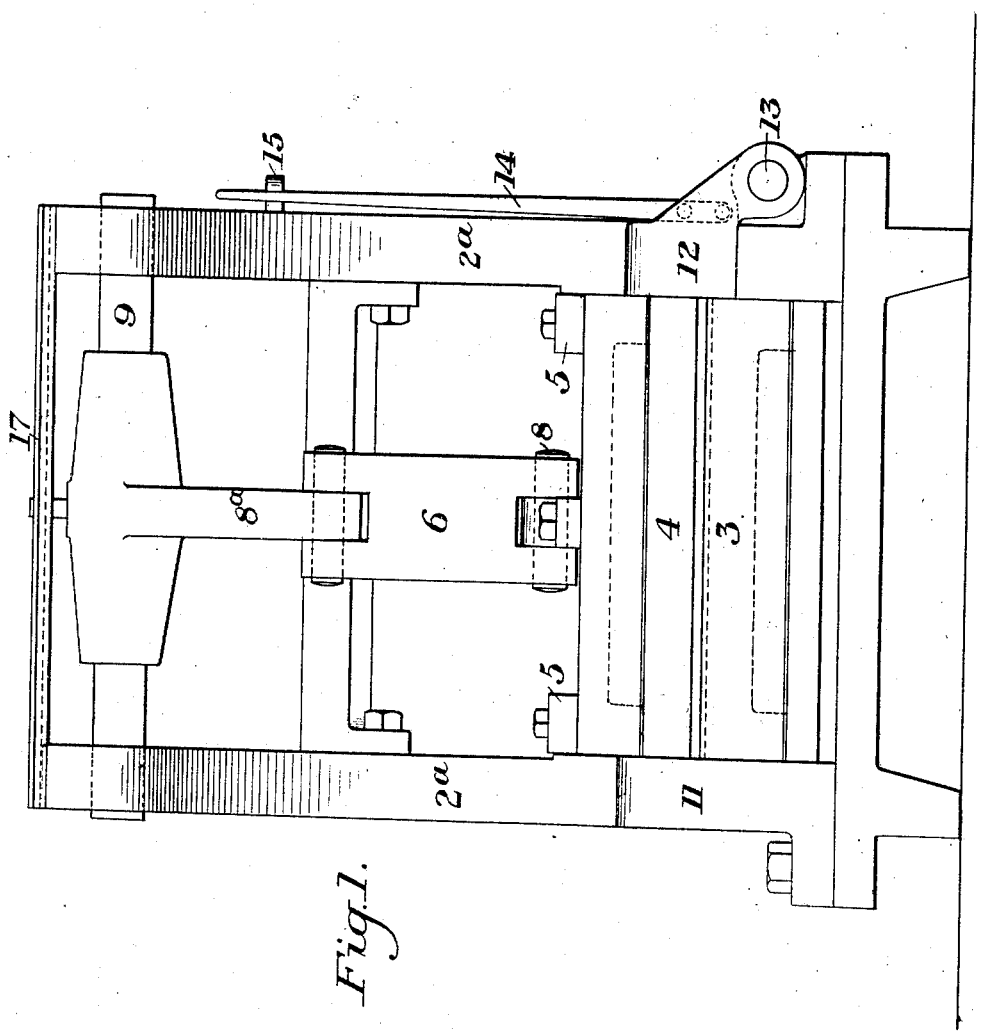
WITNESSES
R A Balderson
W W Swartz
INVENTOR
Wm. T. Nicholls,
by Bakewell & Byrnes,
his Attys.

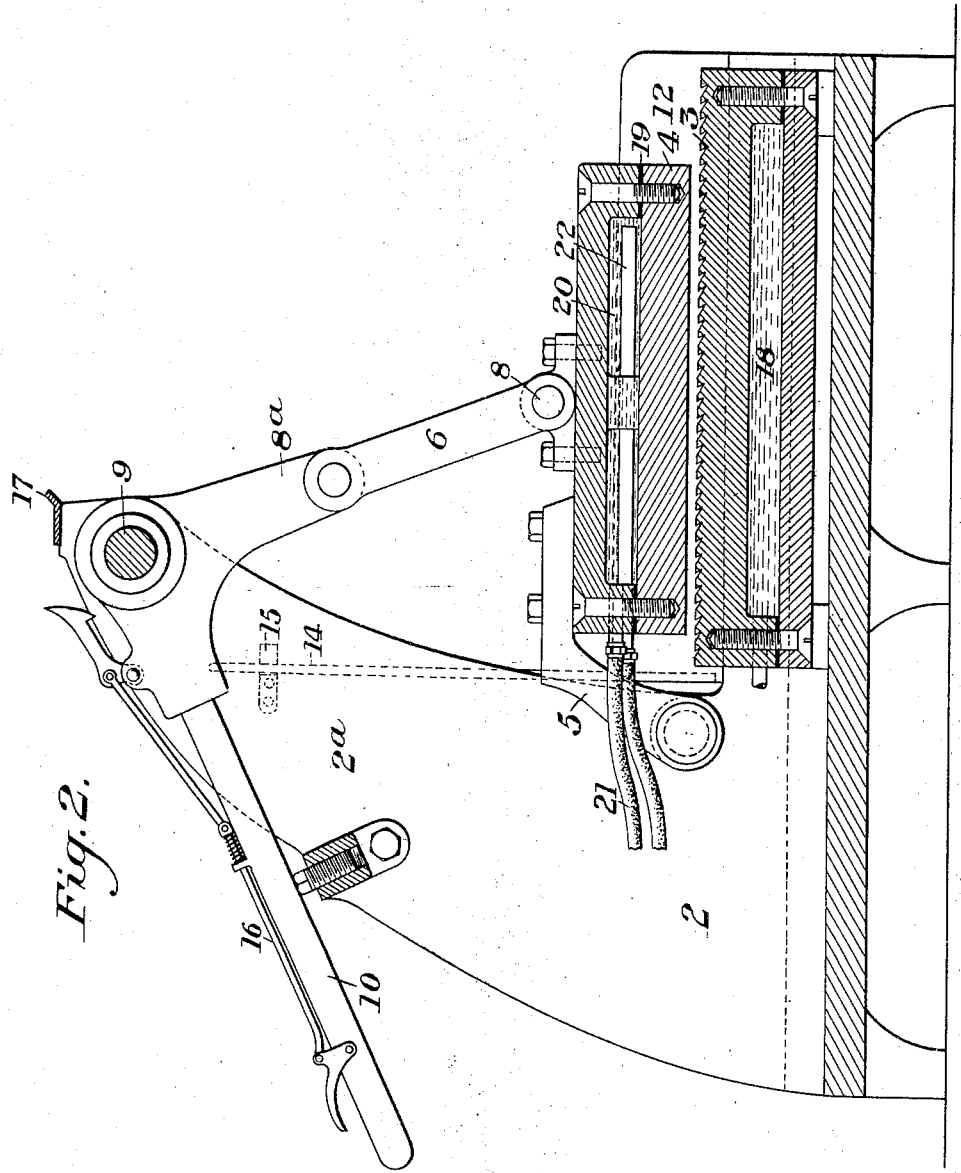

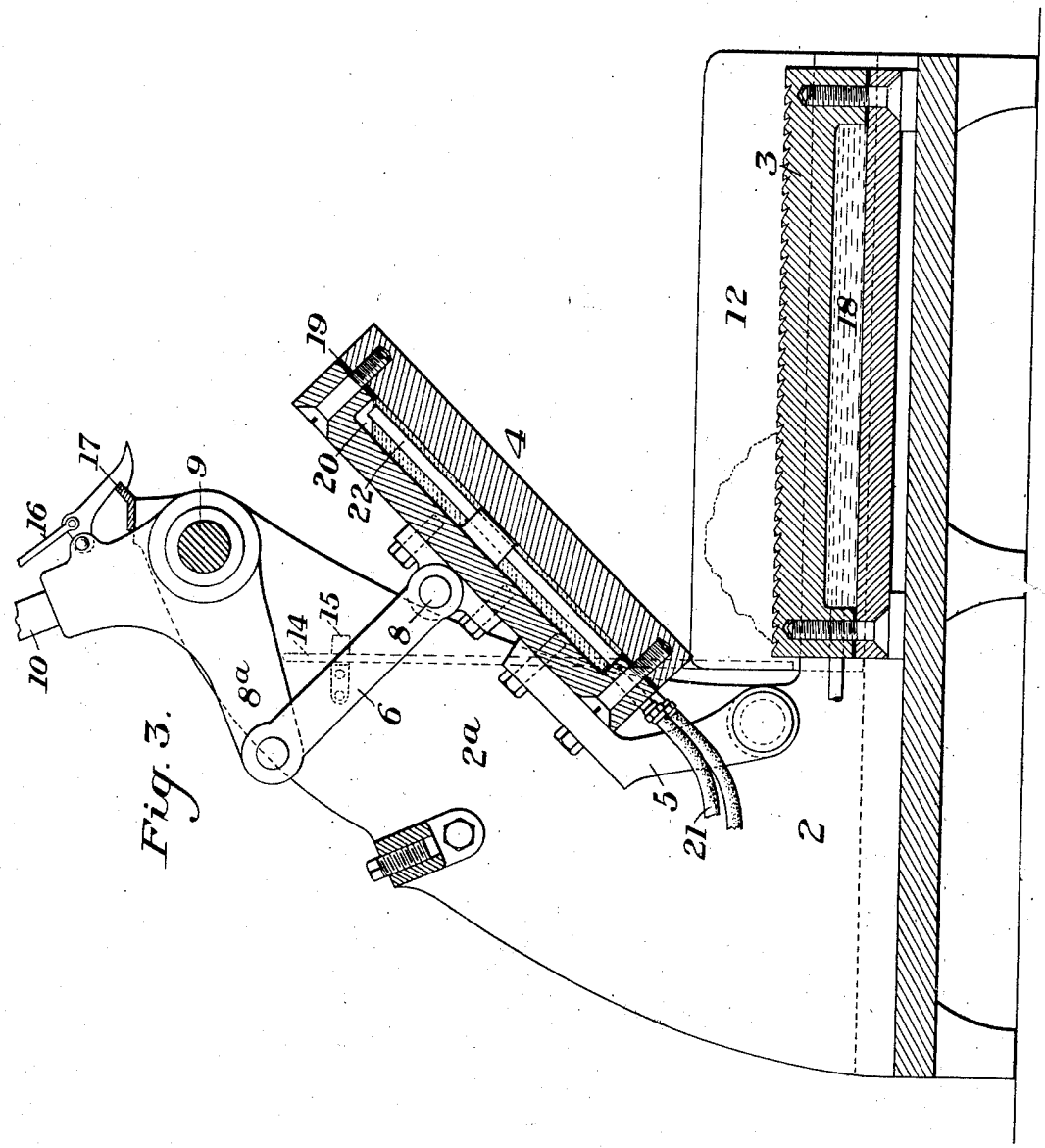

UNITED STATES PATENT OFFICE.

WILLIAM T. NICHOLLS, OF WELLSBURG, WEST VIRGINIA, ASSIGNOR TO THE MONARCH TILE COMPANY, OF WESTON, WEST VIRGINIA, A CORPORATION OF WEST VIRGINIA.

METHOD AND APPARATUS FOR MAKING GLASS SHEETS.

No. 868,578.     Specification of Letters Patent.     Patented Oct. 15, 1907.

Application filed October 13, 1906. Serial No. 338,737.

*To all whom it may concern:*

Be it known that I, WILLIAM T. NICHOLLS, of Wellsburg, Brooke county, West Virginia, have invented a new and useful Method of and Apparatus for Making Glass Sheets, of which the following is a full, clear, and exact description, reference being had to the accompanying drawings, forming part of this specification, in which—

Figure 1 is a front of one form of apparatus embodying my invention; Fig. 2 is a sectional elevation of the same with the flushing platen in its lowest position; and Fig. 3 is a view similar to Fig. 2 but showing the platen raised.

My invention has relation to the manufacture of glass sheets, and is designed to provide a novel method of and apparatus for such manufacture by means of which glass sheets having a smooth upper surface, and a lower surface either figured or plain, may be rapidly, cheaply and efficiently made.

Heretofore it has been attempted to form glass sheets by placing a batch of glass upon a forming surface or table and submitting it to the pressure of a vertically-movable platen, movable perpendicularly to the surface of the forming table. This method has not, however, been successful for the reason that it is necessary to place the batch of glass at the center of the forming table or surface, in order that it may be uniformly spread and distributed as it is pressed by the platen. It has been found that the glass adheres or sticks to the platen at the place where it first comes in contact therewith, which results in a rough or defective surface at the central portion of the formed sheet, although the marginal portions of the sheet may be perfectly smooth and finished. Inasmuch as the defective portion of the sheet thus formed is at its center, the entire sheet is in many cases worthless.

My invention is designed to overcome this objection, and my novel method consists broadly in depositing the batch of molten glass upon one end portion of the table or forming surface and flushing the same over such surface, by flushing pressure applied thereto in an oblique direction, and gradually approaching the vertical. By this method the first contact of the flushing platen with the glass is at a point which forms one end portion of the finished sheet, so that when defective it can be readily cut off and thrown away and the remainder of the sheet saved.

My invention also consists in the novel apparatus for carrying this method into effect, all substantially as hereinafter described and pointed out in the appended claims.

Referring to the accompanying drawings, the numeral 2 designates the frame of a machine which may be used in carrying out my improved method, and which supports a forming table or surface 3. The frame is provided with the upwardly-extending cheeks or housings 2ª between which is hinged or pivoted a flushing platen 4, by means of the hinge or pivot arms 5 secured to the upper surface of said platen at its rear edge portion. This platen is raised and lowered by means of a toggle action consisting of the link 6 pivotally secured to the top of the platen at its central portion by a pin 8, and connected at its upper end to the arm 8ª of an angle lever which is pivoted at 9 between the upper portions of the frame cheeks or housings 2ª. Connected to the other arm of this lever is an operating handle 10. 11 and 12 designate side guides or plates which determine the width of the sheet and between which the flushing platen works. One of these guides is hinged as at 13 in order that it may be turned backwardly away from the forming surface to permit the removal of the sheet. 14 is a latch arm attached to said hinged guide and normally secured by a latch 15 on one of the housings for the purpose of holding the guide in its working position.

16 is a hand operated latch lever mounted on the lever handle 10 and adapted to engage a latch projection 17 on the housing for the purpose of holding the platen in its raised position, as shown in Fig. 3.

The table is preferably provided with an internal chamber 18 for the circulation of water or other cooling medium, and the flushing platen 4 is also preferably formed in two parts with an interposed gasket 19 to form a similar cooling chamber 20 supplied by a flexible pipe 21. 22 is the outlet pipe for the chamber 20, said pipe being extended to a point near the forward end of the chamber, so that when the platen is raised there will be no drainage through this pipe.

The operation is as follows: A batch of glass is placed upon the rear portion of the table 3 as indicated in Fig. 3. The lever handle 10 is then raised to lower the platen. The pressure exerted upon the glass by the platen is initially a flushing pressure which tends to flush the glass forwardly over the entire forming surface, the platen first coming in contact with the glass at that portion thereof which forms the rear edge of the finished sheet. As the platen approaches the limit of its downward movement, its lower surface becomes approximately parallel with the forming surface of the table, and the sheet is pressed thereon. It will be apparent that as the platen approaches this position, and the toggles become nearly straightened, that a very heavy pressure can be applied. After the sheet has been thus formed, the platen is raised, the hinged guide 12 is thrown back, the sheet is removed from the table, and a new batch of glass placed thereon.

The upper surface of the table may be formed with any desired pattern or figure, or it may be plain. In the drawings, I have shown it as provided with transverse undercut recesses 3ª adapted to form under-cut ribs or projections on the lower face of the glass sheet, such as are commonly employed on glass tiles.

While I have illustrated my invention as applied to a hand-operated machine, it is obvious that the flushing platen may be operated by any suitable power, and various other changes may be made by the skilled mechanic, without departing from the spirit and scope of my invention, since

What I claim is:—

1. In the manufacture of glass sheets having undercut projections, the method which consists in placing a batch of molten glass upon a forming surface having transverse undercuts opening toward one end, applying from said end an oblique flushing pressure and gradually changing the direction of pressure to more nearly a perpendicular, to force the glass downwardly and forwardly into the undercut recesses; substantially as described.

2. In the manufacture of glass sheets having undercut projections or recesses, the method which consists in placing a batch of molten glass between forming surfaces extending at an angle to each other and moving at least one of said surfaces toward the other while changing its angle to more nearly a parallel position therewith, and forcing the glass forwardly and downwardly into undercut projections or recesses opening toward the direction of movement; substantially as described.

3. In the manufacture of glass sheets, the method which consists in placing a batch of molten glass upon a forming surface having transverse undercut recesses, applying an oblique flushing pressure thereto from one end, and gradually changing the direction of the pressure toward a perpendicular to the forming surface; substantially as described.

4. Apparatus for the manufacture of glass sheets or tiles having undercut projections, comprising a relatively stationary forming surface or table having undercut recesses extending transversely of the table and opening toward one end of the table, and a flushing platen pivotally mounted at the end of the table toward which the recesses open, and arranged to swing back and forth longitudinally of the table; substantially as described.

5. In apparatus for the manufacture of glass sheets, a pivoted platen having a water chamber therein, and circulating pipes communicating with said chamber, one of said pipes extending to a point in said chamber near the end opposite the pivoted end; substantially as described.

In testimony whereof, I have hereunto set my hand.

WILLIAM T. NICHOLLS.

Witnesses:
JOHN MILLER,
H. M. CORWIN.